(12) United States Patent
Sun (10) Patent No.: US 12,075,270 B2
(45) Date of Patent: Aug. 27, 2024

(54) MEASUREMENT CONFIGURATION METHOD AND RELATED APPARATUS

(71) Applicant: VIVO MOBILE COMMUNICATION CO., LTD., Guangdong (CN)

(72) Inventor: Yanliang Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 395 days.

(21) Appl. No.: 17/489,505

(22) Filed: Sep. 29, 2021

(65) Prior Publication Data

US 2022/0022074 A1 Jan. 20, 2022

Related U.S. Application Data

(63) Continuation of application No. PCT/CN2020/080686, filed on Mar. 23, 2020.

(30) Foreign Application Priority Data

Mar. 29, 2019 (CN) .......................... 201910253219.5

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC . H04W 24/08; H04W 24/10; H04W 72/0446; H04W 72/10; H04W 36/001; H04W 36/0016; H04W 36/0069; H04W 36/08
See application file for complete search history.

(56) References Cited

U.S. PATENT DOCUMENTS

| | | | | |
|---|---|---|---|---|
| 2010/0080176 | A1* | 4/2010 | Maas | H04L 1/0034 370/329 |
| 2015/0327286 | A1 | 11/2015 | Yiu et al. | |
| 2015/0358846 | A1 | 12/2015 | Wu | |
| 2018/0368034 | A1 | 12/2018 | Lin et al. | |
| 2019/0281587 | A1* | 9/2019 | Zhang | H04W 72/23 |
| 2019/0364492 | A1* | 11/2019 | Azizi | H04W 76/14 |

FOREIGN PATENT DOCUMENTS

| | | |
|---|---|---|
| CN | 109151922 A | 1/2019 |
| CN | 109391998 A | 2/2019 |
| WO | 2015171249 A1 | 11/2015 |

OTHER PUBLICATIONS

International Search Report of International Application No. PCT/CN2020/080686 mailed on Jun. 23, 2020.

(Continued)

*Primary Examiner* — Wei Zhao (74) *Attorney, Agent, or Firm* — IP & T GROUP LLP (57) ABSTRACT

A measurement configuration method includes: receiving connected state measurement configuration information, where the measurement configuration information includes S pieces of configuration information, each piece of configuration information includes at least one frequency and priority information of the frequency, and S is a positive integer; and determining a measurement frequency from the S pieces of configuration information.

20 Claims, 5 Drawing Sheets

(56) References Cited

OTHER PUBLICATIONS

Written Opinion of The International Searching Authority of International Application No. PCT/CN2020/080686 mailed on Jun. 23, 2020.
First Office Action of Priority Application No. CN 201910253219.5 mailed on Apr. 6, 2021.
Qualcomm Incorporated, UE Power Consumption Reduction in RRM Measurements, 3GPP TSG-RAN WG1 Meeting #94bis, Nov. 12-16, 2018.

* cited by examiner

MEASUREMENT CONFIGURATION METHOD AND RELATED APPARATUS

CROSS-REFERENCE OF RELATED APPLICATIONS

This application is a Bypass Continuation Application of PCT/CN2020/080686, filed on Mar. 23, 2020, which claims priority to Chinese Patent Application No. 201910253219.5 filed on Mar. 29, 2019, which are incorporated herein by reference in their entirety.

TECHNICAL FIELD

The present disclosure relates to the field of communications technologies, and in particular, to a measurement configuration method and a related apparatus.

BACKGROUND

In a process of wireless communication, network signal quality of a serving cell providing a network service for a terminal (also referred to as user equipment (UE)) may become poor. For example, UE moves from one cell to another cell, load of a wireless transmission service changes, or there is a device failure. In this case, cell handover occurs to ensure communication continuity and service quality, that is, a communication link between the UE and an original cell switches to a new cell.

SUMMARY

According to a first aspect, an embodiment of the present disclosure provides a measurement configuration method. The method is applied to a terminal and includes:
  receiving connected state measurement configuration information, where the measurement configuration information includes S pieces of configuration information, each piece of configuration information includes at least one frequency and priority information of the frequency, and S is a positive integer; and
  determining a measurement frequency from the S pieces of configuration information.

According to a second aspect, an embodiment of the present disclosure provides a measurement configuration method. The method is applied to a network side device and includes:
  sending connected state measurement configuration information to a terminal, where the measurement configuration information includes S pieces of configuration information, each piece of configuration information includes at least one frequency and priority information of the frequency, and S is a positive integer.

According to a third aspect, an embodiment of the present disclosure further provides a terminal, including:
  a first receiving module, configured to receive connected state measurement configuration information, where the measurement configuration information includes S pieces of configuration information, each piece of configuration information includes at least one frequency and priority information of the frequency, and S is a positive integer; and
  a first processing module, configured to determine a measurement frequency from the S pieces of configuration information.

According to a fourth aspect, an embodiment of the present disclosure further provides a network side device, including:
  a first sending module, configured to send connected state measurement configuration information to a terminal, where the measurement configuration information includes S pieces of configuration information, each piece of configuration information includes at least one frequency and priority information of the frequency, and S is a positive integer.

According to a fifth aspect, an embodiment of the present disclosure further provides a terminal, including: a memory, a processor, and a computer program stored in the memory and executable on the processor, where the computer program, when executed by the processor, implements steps of the measurement configuration method according to the first aspect.

According to a sixth aspect, an embodiment of the present disclosure further provides a network side device, including: a memory, a processor, and a computer program stored in the memory and executable on the processor, where the computer program, when executed by the processor, implements steps of the measurement configuration method according to the second aspect.

According to a seventh aspect, an embodiment of the present disclosure further provides a non-transitory computer-readable storage medium, where a computer program is stored in the non-transitory computer-readable storage medium. When the computer program is executed by a processor, steps of the measurement configuration method according to the first aspect or the second aspect are implemented.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

Figure 1:
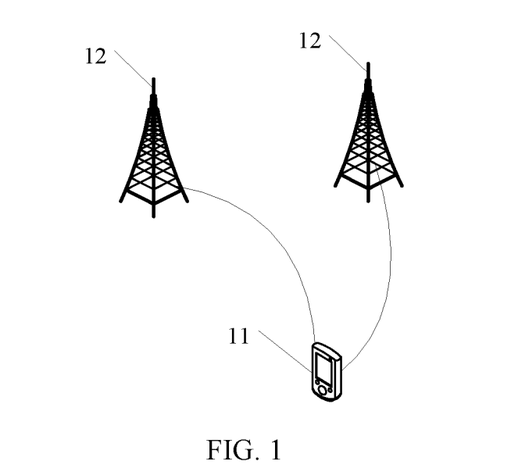
FIG. 1 is a structural diagram of a network system to which embodiments of the present disclosure can be applied.

Referring to FIG. 1, FIG. 1 is a schematic diagram of a network to which an embodiment of the present disclosure can be applied. As shown in FIG. 1, the network includes a terminal 11 and a network side device 12. The terminal 11 may be a terminal side device such as a mobile phone, a tablet personal computer, a laptop computer, a personal digital assistant (PDA), a mobile Internet device (MID), or a wearable device. It should be noted that a specific type of the terminal 11 is not limited in this embodiment of the present disclosure. The network side device 12 may be, for example, a macro base station, a long term evolution (LTE) evolved NodeB (eNB), a fifth-generation (5G) new radio (NR) NodeB (NB), or the like. The network side device 12 may alternatively be a small cell, for example, a low power node (LPN), a pico cell, or a femto cell. The network side device 12 may alternatively be an access point (AP). The network side device 12 may alternatively be a network node including a central unit (CU) and a plurality of transmission reception points (TRP) managed and controlled by the central unit. It should be noted that a specific type of the network side device 12 is not limited in the embodiments of the present disclosure.

In a process of cell handover, the UE usually measures a frequency of a serving cell and a frequency around the cell according to a measurement configuration message delivered by a network side, and reports a measurement result to the network side. The network side performs evaluation and makes a decision according to the measurement result and finally controls, according to a decision result, the UE to switch to a target cell. However, in related technologies, in a measurement process, selection of a measurement frequency usually depends on the UE, but the UE is easy to be unable to accurately determine a cell frequency that should be measured. As a result, it is possible that a cell with good communication quality cannot be found in time. Therefore, power consumption of the terminal in the process of cell handover is easily increased.

Figure 2:
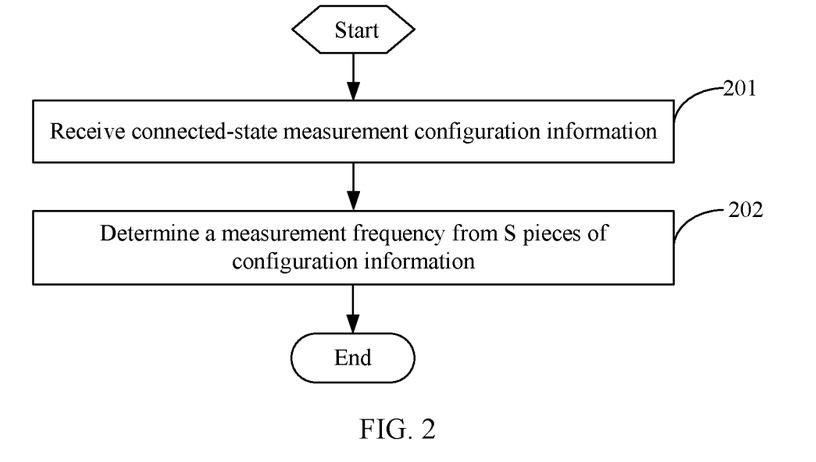
FIG. 2 is a flowchart of a measurement configuration method according to an embodiment of the present disclosure.

Referring to FIG. 2, FIG. 2 is a flowchart of a measurement configuration method according to an embodiment of the present disclosure, applied to the terminal 11. As shown in FIG. 2, the method includes the following steps.

Step 201: Receive connected state measurement configuration information, where the measurement configuration information includes S pieces of configuration information, each piece of configuration information includes at least one frequency and priority information of the frequency, and S is a positive integer.

Step 202: Determine a measurement frequency from the S pieces of configuration information.

In the embodiments, the terminal receives, in a radio resource control connected (RRC connected) state, the measurement configuration information configured by the network side device, and performs radio resource management (RRM) measurement according to the measurement configuration information. The measurement configuration information may include configuration information of a measurement event such as an intra-frequency measurement event, an inter-frequency measurement event, or an inter-radio access technology (Inter-RAT) measurement event. The measurement configuration information may be configured by the network side device for the terminal through RRC signaling.

Optionally, the measurement configuration information includes the S pieces of configuration information. Each piece of configuration information includes at least one frequency and priority information of each frequency, and the priority information of each frequency may be used to represent a priority of the frequency relative to at least one frequency in the configuration information.

It should be noted that the priority of each frequency can be indicated explicitly or implicitly. Indicating explicitly means directly indicating priorities of frequencies through information such as different numbers, and indicating implicitly means indirectly indicating priorities of frequencies through sequential arrangement.

Optionally, each piece of configuration information may further include cell identifier information of a frequency.

In this way, each piece of configuration information not only includes the at least one frequency and the priority information of the frequency, but also includes the cell identifier (Cell id) information of the frequency. The terminal may further determine, according to the configuration information, a cell that needs to be measured. In the solution in which the configuration information includes the cell identifier information, the terminal is provided with more concise and clear configuration information, which further simplifies an RRM measurement operation of the terminal.

After obtaining the S pieces of configuration information, the terminal selects, as the measurement frequency, at least one frequency from multiple frequencies included in the S pieces of configuration information. In a specific scenario, for example, signal quality of a serving cell of the terminal deteriorates, the terminal may measure the determined measurement frequency, report a measurement result to the network side device, and then hand over from an original cell with relatively poor signal quality to another cell with relatively good signal quality as instructed by the network side device, to quickly complete cell handover.

In the above process, the number of determined measurement frequencies is at least one, and the measurement frequency includes at least frequencies of intra-frequency neighboring areas. The terminal selects the measurement frequency from the at least one frequency based on a status parameter of the terminal or relevant indication information that is sent by the network side device. The status parameter may include a measurement status of the terminal. The relevant indication information sent by the network side device may indicate a measurement frequency or a cell identifier. This is not limited herein.

In addition, during frequency measurement, the terminal measures a serving cell and other cells (an intra-frequency adjacent cell, an inter-frequency cell, an inter-radio access technology cell, and the like). Therefore, the at least one frequency in each piece of configuration information does not include a frequency of a serving cell that needs to be measured by the terminal. The at least one frequency includes a frequency of an intra-frequency neighboring cell of a serving cell that needs to be measured in addition to the serving cell, and frequencies of other possible cells with relatively good communication quality.

In the measurement configuration method provided in the embodiments of the present disclosure, the terminal directly determines a measurement frequency from at least one cell frequency with relatively good communication quality. Therefore, a cell with relatively good communication quality can be more quickly found, to reduce power consumption of the terminal in the process of cell handover.

In the embodiments of the present disclosure, the S pieces of configuration information may be one piece of configuration information. The one piece of configuration information includes at least one frequency, and the terminal may determine the measurement frequency from the at least one frequency in the one piece of configuration information.

Alternatively, the S pieces of configuration information may also be multiple pieces of configuration information, and the terminal may determine the measurement frequency from frequencies in the multiple pieces of configuration information.

Optionally, S is greater than 1, and step 202 may include:
determining target configuration information according to the S pieces of configuration information; and
determining the measurement frequency from at least one frequency in the target configuration information.

This implementation further provides a solution in which the terminal determines the measurement frequency from the at least one frequency. The terminal first selects configuration information from the S pieces of configuration information as target configuration information, and then determines at least one frequency from at least one frequency in the selected target configuration information as the measurement frequency. In this way, this step-by-step selection operation can simplify the operation of selecting the measurement frequency by the terminal.

Optionally, an algorithm may be preset in the terminal, and the terminal selects the target configuration information from the S pieces of configuration information according to the preset algorithm. The preset algorithm may be determined specifically based on an operating parameter, a current environment status parameter, and the like of the terminal.

Alternatively, optionally, before Step 201, the method may further include:
receiving second indication information, where the second indication information is used to indicate the target configuration information.

The network side device may specify, according to factors such as a current environment of the terminal, matched target configuration information for the terminal. The network sends the second indication information indicating the target configuration information to the terminal, and the terminal may select the target configuration information from the S pieces of configuration information according to the second indication information. The network side device may specify, according to a current environment of the terminal, optional target configuration information for the terminal, to further optimize a frequency measurement solution of the terminal. The network may further determine the target configuration information in other implementations, which are not limited herein.

Optionally, the second indication information may be a medium access control-control element (MAC CE).

In addition, after configuring the S pieces of configuration information for the terminal, the network side device may further modify a frequency and priority information of the frequency in each of the S pieces of configuration information through an RRC message. The network side device may configure, according to a current environment of the terminal, optional S pieces of configuration information for the terminal, to further optimize a frequency measurement solution of the terminal.

After determining the target configuration information, the terminal selects the measurement frequency from at least one frequency included in the target configuration information. The terminal may directly use all frequencies in the target configuration information as the measurement frequency, or select some frequencies from the at least one frequency as the measurement frequency according to a preset algorithm, other reference factors, or blind selection. It should be noted that the number of measurement frequencies and a frequency type selected by the terminal need to meet the number of frequencies supported by the terminal. In addition, a measurement gap of the serving cell of the terminal needs to include a total time required for measuring multiple measurement frequencies, to ensure a normal communication function and a measurement effect of the terminal.

Optionally, a priority of the measurement frequency is less than or equal to a measurement status value of the terminal.

The terminal has multiple measurement statuses. The terminal corresponds to a measurement status value in each measurement status. The terminal determines the finally selected measurement frequency based on the measurement status value corresponding to the measurement status and a priority (that is, a priority represented by priority information of a frequency) of the frequency in the S pieces of configuration information (such as at least one frequency in the target configuration information). The measurement status of the terminal may be a status of multiple operating statuses of the terminal that is associated with power of the terminal, signal transmission and reception, and the like. For example, the measurement status value may be calculated according to power of the terminal.

Assuming that the terminal is in a specific measurement status and a measurement status value of the measurement status is n, if the terminal only selects the measurement frequency in the target configuration information, the terminal determines a frequency whose priority is less than or equal to n in the target configuration information as the measurement frequency. n=1, . . . , and N and N is less than or equal to max (K_1, . . . , K_i, . . . and K_S). K_i is a priority of a frequency i in the target configuration information, and max (K_1, . . . , K_i, . . . K_S) is the highest priority of a frequency of the at least one frequency in the target configuration information.

In this way, the terminal may use the frequency whose priority is greater than or equal to 1 and less than or equal to n and that is of the at least one frequency in the target configuration information as the measurement frequency. For example, if a priority of a current measurement status value of the terminal is 3, the terminal may use frequencies with priorities 1 to 3 in the target configuration information as the measurement frequency.

Certainly, in other implementations, the terminal may be further preconfigured with a correspondence between the measurement status value of the measurement status and the priority of the frequency, or an algorithm for calculating the priority of the measurement frequency according to the measurement status value of the measurement status, or other solutions for selecting the measurement frequency based on the measurement status. This is not limited herein.

Optionally, the network side device may further directly indicate, to the terminal, the frequency that specifically needs to be measured or cell identifier information, to further simplify the operation of selecting the measurement frequency by the terminal.

In some implementations, after step 201, the method may further include:
  sending first indication information to a network side device, where the first indication information is used to indicate the measurement status value.

The terminal may report the current measurement status value of the terminal to the network side device as the first indication information through a MAC CE, so that the network side device may indicate, according to the measurement status, information corresponding to the measurement frequency of the terminal, and perform uplink and downlink scheduling based on the configuration.

In some implementations, each piece of configuration information may further include at least one of the following:
  a measurement gap allocation factor of a frequency or a measurement gap configuration of a frequency.

In this implementation, the configuration information further includes a measurement gap allocation (Measurement gap sharing) factor of the frequency and/or a measurement gap configuration of the frequency. The terminal may adjust an RRM measurement level according to the measurement gap allocation factor or the measurement gap configuration, to satisfy a corresponding protocol indicator to ensure network connection performance of the terminal, thereby ensuring that the terminal is in a normal communication state.

Exemplarily, in an RRC connected state, for measurement events (A3/B2/other measurement events) configured by the network, the network may configure a full set of measurement events for the UE through RRC signaling, and provide a priority configuration (that is, measurement configuration information) of S measurement events, where S>0. The priority configuration includes 1) a priority level; 2) a frequency corresponding to the priority, where optionally, cell id information (a white cell configuration and a black cell configuration) of the frequency is further included; 3) a measurement gap allocation factor corresponding to the frequency; and 4) a measurement gap configuration.

Specifically, the following table 1 shows one piece of configuration information received by the terminal. It can be seen from table 1 that the terminal may obtain multiple frequencies from the configuration information and a measurement gap allocation factor and a measurement gap configuration of each frequency. The terminal determines a specific frequency measurement solution according to the measurement gap allocation factor and the measurement gap configuration corresponding to the frequency. A cell frequency includes at least a frequency of an intra-frequency neighboring area of a serving cell, a frequency indicated by a global synchronization channel number (GSCN), a frequency indicated by a new radio-absolute radio frequency channel number (NR-ARFCN), a frequency of an ordinary cell list, a white cell list, and a black cell list corresponding to other frequencies, or the like.

TABLE 1

| Priority (k) | Frequency and Cell List | Measurement Gap Allocation factor (Y) | Measurement Gap Configuration of Terminal |
|---|---|---|---|
| 1 | intra-frequency neighboring area of serving cell | Y_1 | g_1 |
| 2 | GSCN or NR-ARFCN or other frequency indications: x (white cell: x1 and x2, and black cell: x3) | Y_2 | g_2 |
| ... | ... | ... | ... |
| K | GSCN or NR-ARFCN or other frequency indications: y (white cell: y1); or GSCN or NR-ARFCN or other frequency indications: z (neither a white cell nor a black cell is configured) | Y_K | g_K |

Optionally, as shown in table 2 below, the measurement priority configuration further may include a serving cell. In this case, the measurement status value n of the UE satisfies n=2, ..., and N.

TABLE 2

| Priority (k) | Frequency and Cell List | Measurement Gap Allocation factor (Y) | Measurement Gap Configuration of Terminal |
|---|---|---|---|
| 1 | serving cell | N.A. | N.A. |
| 2 | intra-frequency neighboring area of serving cell | Y_2 | g_2 |
| 3 | GSCN or NR-ARFCN or other frequency indications: x (white cell: x1 and x2, and black cell: x3) | Y_3 | g_3 |
| ... | ... | ... | ... |
| K | GSCN or NR-ARFCN or other frequency indications: y (white cell: y1); or GSCN or NR-ARFCN or other frequency indications: z (neither a white cell nor a black cell is configured) | Y_K | g_K |

In some implementations, in a case that each piece of configuration information includes a measurement gap allocation factor of a frequency, after step 202, the method may further include:
  measuring a first frequency of measurement frequencies according to a measurement gap allocation ratio;
  where the measurement gap allocation ratio is a ratio of a measurement gap allocation factor of the first frequency to a sum of measurement gap allocation factors of the measurement frequencies.

In this implementation, the configuration information includes the measurement gap allocation factor of the measurement frequency, and the terminal determines a measurement gap allocation ratio of each measurement frequency according to the measurement gap allocation factor of the measurement frequency, and performs frequency measurement based on the determined measurement gap allocation ratio.

For example, a measurement gap allocation ratio X_k % corresponding to a measurement frequency of a k-th priority is: a ratio of a measurement gap allocation factor Y_k corresponding to the k-th priority to a sum of measurement gap allocation factors of all measurement frequencies:

$$X\_k\% = Y\_k/(Y\_1 + \ldots + Y\_n) \times 100\%.$$

In this way, the terminal may determine specific measurement gap allocation ratios of all the measurement frequencies, and determine a measurement gap of each measurement frequency according to the total measurement gap configuration and the measurement gap allocation ratio of each measurement frequency, to ensure that measurement operations of all the measurement frequencies can be completed in accordance with the indicated allocation ratio.

In some implementations, in a case that each piece of configuration information includes a measurement gap configuration of a frequency, a first measurement gap includes a second measurement gap;
the first measurement gap is: a measurement gap in a measurement gap configuration corresponding to a (k+1)-th priority; and
the second measurement gap is: a measurement gap in a measurement gap configuration corresponding to a k-th priority, where k is a positive integer.

In this implementation, a lateral gap sharing solution is further provided, so that a measurement gap of a measurement frequency with a higher priority includes a measurement gap of a measurement frequency with a lower priority.

Exemplarily, in a case that the UE is configured with the priority configuration shown in table 1, for all measurement gap configurations, g_(k+1) includes g_k, that is, the first measurement gap includes the second measurement gap.

Table 3 shows a measurement gap configuration solution of a specific protocol agreed on. It can be seen from table 3 that measurement gap lengths and measurement gap repetition periods in different gap patterns are different. When the terminal configures a same subframe gap offset setting gapOffset for measurement gaps during configuration of the gap pattern, measurement gap configuration solutions of different gap patterns have the following inclusion relationship: 4>0>1>5; 10>2>3>11; and 6>7>8>9.

TABLE 3

| Gap Pattern | Measurement Gap Length (MGL, ms) | Measurement Gap Repetition Period |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 5.5 | 20 |
| 17 | 5.5 | 40 |
| 18 | 5.5 | 80 |
| 19 | 5.5 | 160 |
| 20 | 1.5 | 20 |
| 21 | 5.5 | 40 |
| 22 | 5.5 | 80 |
| 23 | 5.5 | 160 |

It should be noted that, in the case that the terminal sends the first indication information to the network side device to report the measurement status value n, the network side device may determine, according to n, the measurement gap configuration corresponding to the measurement frequency.

The above solution is explained in detail below in a implementation. The network side device determines the location of the terminal according to beam information of the terminal, and then roughly determines a full set of neighboring areas of the terminal according to the location of the terminal. Certainly, the network side device may also determine all possible current neighboring areas of the terminal through other methods. This is not limited. It is assumed that frequencies of the current full set of intra-frequency neighboring areas of the terminal include: an intra-frequency a, an inter-frequency b, an inter-frequency c, and an inter-RAT frequency d. In this case, the full set of neighboring cells includes: cells a1, a2, and a3 corresponding to the intra-frequency a, cells b1 and b2 corresponding to the inter-frequency b, a cell c1 corresponding to the inter-frequency c, and a cell d corresponding to the inter-RAT frequency d. The number of pieces of configuration information is S=2. A first piece of configuration information is shown in table 4, and a second piece of configuration information is shown in table 5.

TABLE 4

| Priority | Frequency and Cell Number List | Measurement Gap Allocation factor (Y) | Gap Configuration of Terminal |
|---|---|---|---|
| 1 | serving cell | N.A. | N.A. |
| 2 | frequency of intra-frequency neighboring area | 20 | 5 |
| 3 | a (white cell: a1 and a2; black cell: a3) | 40 | 1 |
| 4 | b (white cell: b1 and b2) | 40 | 0 |
| 5 | c (black cell: c1) d (no white cell is configured) | 20 | 4 |

TABLE 5

| Priority | Frequency and Cell List | Measurement Gap Allocation ratio (X %) | Gap Configuration of Terminal |
|---|---|---|---|
| 1 | serving cell | N. A. | N.A. |
| 2 | frequency of intra-frequency neighboring area | 20 | 5 |
| 3 | b (white cell: b1 and b2) | 40 | 1 |
| 4 | a (white cell: a1 and a2 black cell: a3) | 40 | 1 |
| 5 | d (no white cell is configured) | 10 | 0 |
| 6 | c (white cell: c1) | 10 | 4 |

Based on the S pieces of configuration information configured by the network side device for the terminal, the network side device may
use a MAC CE of log 2 (S) bits to indicate a combination configuration currently used by the CE, so that the terminal may dynamically switch between the S pieces of configuration information. In terms of a time sequence, starting from a time point at which a MAC-layer data packet corresponding to a MAC CE is successfully received and the terminal receives signaling indicating acknowledgment (acknowledgment ACK), the terminal performs RRM measurement according to the channel measurement configuration.

Optionally, the terminal may further set a measurement status of the terminal to adaptively adjust RRM measurement overheads of the terminal. For the S pieces of configuration information configured by the network side device for the terminal, when a priority of a measurement status value of the terminal is n, a frequency whose priority is less than or equal to n is used as the measurement frequency. In this case, the terminal determines a measurement gap allocation ratio of each measurement frequency according to a ratio of a measurement gap allocation factor of the measurement frequency to a sum of measurement gap allocation factors of all measurement frequencies. Based on this, in definition of RRM test metrics, a series of power templates corresponding to priorities of measurement status values of the terminal may be defined, to measure whether the terminal can switch to a corresponding status configuration in a specific reference signal received power (RSRP) change trend, to ensure RRM performance.

For example, assuming that the priority of the measurement status value of the terminal is n, it needs to be ensured that in an RSRP power change trend of a serving cell and a corresponding frequency number of adjacent cells defined by a specific test RSRP template, within a time corresponding to a specific metric, the terminal may report a measurement and complete corresponding switch to ensure RRM performance.

Optionally, the terminal reports a measurement state n of the terminal to the network through a MAC CE, to help the network determine a measurement gap configuration currently required by the terminal and perform uplink and downlink scheduling for the configuration. In terms of a time sequence, starting from a time point at which a MAC-layer data packet corresponding to a MAC CE is successfully received and the network side device delivers signaling indicating acknowledgment ACK, the terminal and the network side device both execute the new measurement gap configuration, and the network side device performs new uplink and downlink scheduling according to the configuration.

For the first piece of configuration information shown in table 2, when the priority n of the measurement status value of the terminal is 3, the measurement frequency determined by the terminal is frequencies of priorities 1 to 3, and the measurement gap configuration of the terminal is 1. A measurement gap allocation ratio determined by the terminal for a frequency of priority level 2 is:

$$X\_2\% = Y\_2/(Y\_2 + Y\_3) \times 100\% = 33.3\%.$$

A measurement gap ratio that should be allocated by the UE for a measurement event of priority level 3 is:

$$X\_3\% = Y\_3/(Y\_2 + Y\_3) \times 100\% = 66.7\%.$$

The terminal can sequentially measure intra-frequency neighboring areas a and b according to the measurement gap allocation ratio.

Alternatively, at a specific moment, if the terminal finds that the terminal is within good coverage for a long time, that is, the RSRP is greater than a preset threshold, or the terminal is in a static state for a long time, that is, maximum fluctuation of the RSRP in a period of time is less than a preset threshold, the terminal may adjust a measurement status of the terminal, that is, the priority of the measurement status value is switched from 3 to 2. Starting from a time point at which the measurement status of the terminal is switched and it is determined that the MAC CE is received by the network, the terminal further needs to switch the measurement frequency, that is, use only frequencies of priority levels 1 and 2 as the measurement frequency, and adjust the measurement gap to configuration 5. In this case, all measurement gaps of the terminal may be used to measure the measurement frequency of priority level 2.

For another example, Optionally, assuming that the network configures S measurement event priority configurations, where S=2, the following two situations may exist:

In a first case, according to the priority n of the measurement status value reported by the terminal, the network side device may modify a specific frequency configuration in each of the S configurations through RRC signaling, where S=2, and further indicate the UE to select a configuration from the two configurations through log 2 (S)=1 bit in the MAC CE.

It is assumed that an environment of the terminal includes intra-frequency neighboring areas and neighboring areas corresponding to the frequencies a and b. After the terminal reports n=3, the network side device may modify the S configurations, where S=2. The first configuration includes a and the second configuration includes b. Optionally, assuming that the network side device currently configures S=0, that is, selects to configure the first configuration for the terminal, the network side device switches the terminal to the state of S=2 through the MAC CE based on a current measurement result of the terminal. In this way, there are fewer measurement statuses of the terminal, that is, the priority of the measurement status value is lower. For example, if the terminal considers that the terminal needs to save power, the network side device controls the terminal to measure the frequency a and the frequency b.

In a second case, according to the current measurement result reported by the terminal and a neighboring area relationship established by the network side device based on an internal algorithm, an approximate location of the terminal is determined. Then, based on S neighboring areas and corresponding priorities configured through RRC, where S=2, log 2(S)=1 bit is used to dynamically indicate the terminal to select a neighboring area from the two neighboring areas.

In addition to the measurement configuration solutions provided in the foregoing embodiments, the embodiments of the present disclosure further provide a measurement configuration solution when reestablishment performed by the terminal after a radio link failure (RLF) fails. Optionally, after the determining the measurement frequency from the at least one frequency in step 202, the method further includes:

in a case that reestablishment performed after a radio link failure is detected fails, determining a measurement time window length of a second frequency within a preset time period in which an idle state is already entered, where the second frequency is a frequency determined by the terminal based on the measurement configuration information.

In this implementation, within N_s seconds after the terminal fails to complete reestablishment after an RLF and then enters the idle state, the terminal may further determine the measurement frequency according to the measurement configuration information configured by the network side device in the above solution. This embodiment is different from the above embodiment in that in the process of determining the measurement frequency by the terminal according to the configuration information, the terminal may determine a measurement time window length of each frequency, that is, the frequency gap configuration solution configured by the network side device is invalid.

After the preset duration of N_s seconds is over, if the terminal still fails to complete reestablishment, the terminal enters a free cell selection process. If the terminal can find a serving cell, the terminal performs RRC reestablishment attempt based on a frequency most recently indicated by the serving cell. If the terminal cannot find a serving cell, a blind search process is started.

This implementation defines the cell search solution after an RLF, to accelerate reestablishment by the terminal under various abnormal conditions as much as possible, improve measurement efficiency, and ensure network connection performance.

Figure 3:
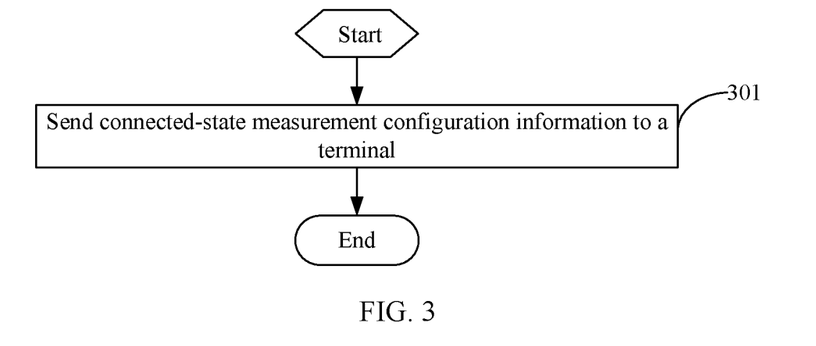
FIG. 3 is a flowchart of another measurement configuration method according to an embodiment of the present disclosure.

Referring to FIG. 3, FIG. 3 is a flowchart of a measurement configuration method according to an embodiment of the present disclosure, applied to a network side device. As shown in FIG. 3, the measurement configuration method includes the following steps.

Step 301: Send connected state measurement configuration information to a terminal, where the measurement configuration information includes S pieces of configuration information, each piece of configuration information includes at least one frequency and priority information of the frequency, and S is a positive integer.

Optionally, each piece of configuration information further includes at least one of the following:
 a measurement gap allocation factor of a frequency or a measurement gap configuration of a frequency.

Optionally, after the sending connected state measurement configuration information to a terminal, the method further includes:
 receiving first indication information sent by the terminal, where the first indication information is used to indicate the measurement status value of the terminal.

Optionally, in a case that each piece of configuration information includes a priority of a frequency and a measurement gap configuration of a frequency, a first measurement gap includes a second measurement gap;
 the first measurement gap is: a measurement gap in a measurement gap configuration corresponding to a (k+1)-th priority; and
 the second measurement gap is: a measurement gap in a measurement gap configuration corresponding to a k-th priority, where k is a positive integer.

Optionally, each piece of configuration information further includes cell identifier information of a frequency.

Optionally, after the sending connected state measurement configuration information to a terminal, the method further includes:
 sending second indication information to the terminal, where the second indication information is used to indicate the target configuration information.

It should be noted that this embodiment of the present disclosure is used as an embodiment of a network side device corresponding to the embodiment shown in FIG. 2. For implementations of this embodiment, refer to related descriptions of the embodiment shown in FIG. 2. The same beneficial effects can be achieved. To avoid repetition, details are not described herein again.

Figure 4:
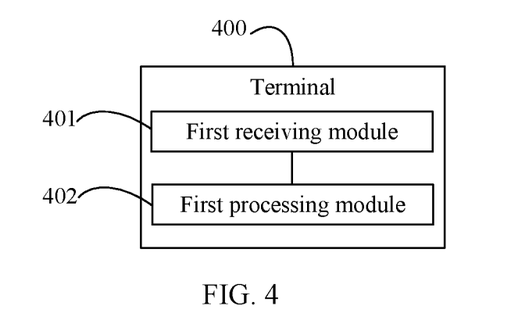
FIG. 4 is a structural diagram of a terminal according to an embodiment of the present disclosure.

Referring to FIG. 4, FIG. 4 is a structural diagram of a terminal according to an embodiment of the present disclosure. As shown in FIG. 4, the terminal 400 includes:
 a first receiving module 401, configured to receive connected state measurement configuration information, where the measurement configuration information includes S pieces of configuration information, each piece of configuration information includes at least one frequency and priority information of the frequency, and S is a positive integer; and
 a first processing module 402, configured to determine a measurement frequency from the S pieces of configuration information.

Optionally, each piece of configuration information further includes at least one of the following:
 a measurement gap allocation factor of a frequency or a measurement gap configuration of a frequency.

Optionally, in a case that each piece of configuration information includes a measurement gap configuration of a frequency, a first measurement gap includes a second measurement gap;
 the first measurement gap is: a measurement gap in a measurement gap configuration corresponding to a (k+1)-th priority; and
 the second measurement gap is: a measurement gap in a measurement gap configuration corresponding to a k-th priority, where k is a positive integer.

Figure 5:
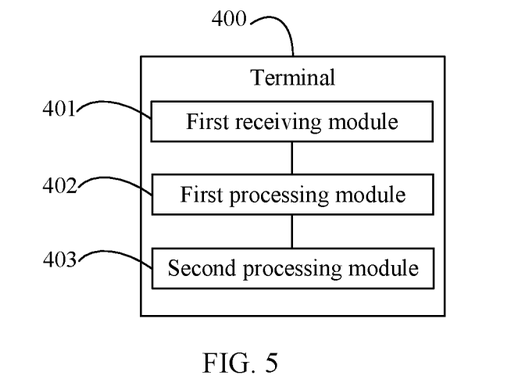
FIG. 5 is a structural diagram of another terminal according to an embodiment of the present disclosure.

Optionally, in a case that each piece of configuration information includes a measurement gap allocation factor of a frequency, as shown in FIG. 5, the terminal 400 further includes:
 a second processing module 403, configured to measure a first frequency of measurement frequencies according to a measurement gap allocation ratio;
 where the measurement gap allocation ratio is a ratio of a measurement gap allocation factor of the first frequency to a sum of measurement gap allocation factors of the measurement frequencies.

Optionally, each piece of configuration information further includes cell identifier information of a frequency.

Optionally, a priority of the measurement frequency is less than or equal to a measurement status value of the terminal.

Figure 6:
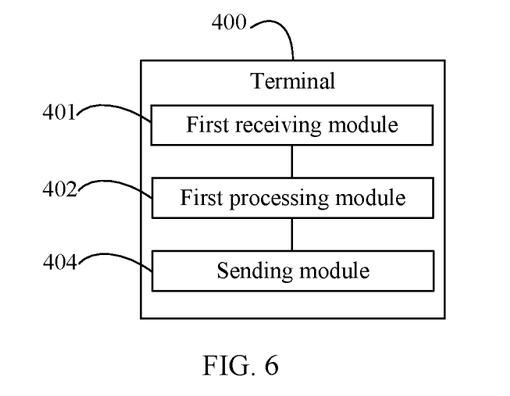
FIG. 6 is a structural diagram of another terminal according to an embodiment of the present disclosure.

Optionally, as shown in FIG. 6, the terminal 400 further includes:
 a sending module 404, configured to send first indication information to a network side device, where the first indication information is used to indicate the measurement status value.

Figure 7:
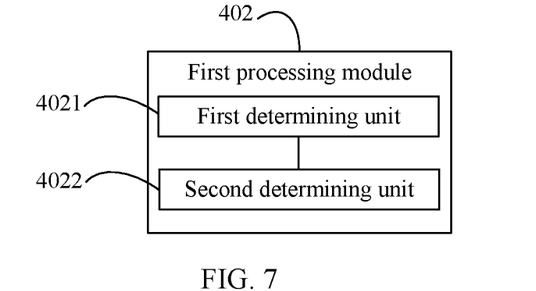
FIG. 7 is a structural diagram of a first processing module according to an embodiment of the present disclosure.

Optionally, S is greater than 1, and as shown in FIG. 7, the first processing module 402 includes:
 a first determining unit 4021, configured to determine target configuration information according to the S pieces of configuration information; and
 a second determining unit 4022, configured to determine the measurement frequency from at least one frequency in the target configuration information.

Figure 8:
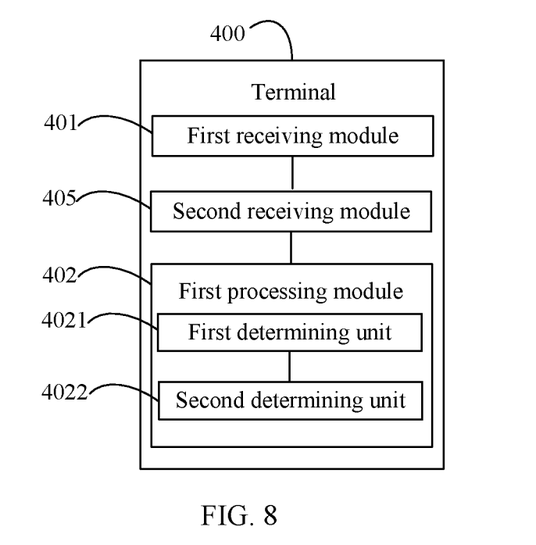
FIG. 8 is a structural diagram of another terminal according to an embodiment of the present disclosure.

Optionally, as shown in FIG. 8, the terminal 400 further includes:
 a second receiving module 405, configured to receive second indication information, where the second indication information is used to indicate the target configuration information.

Figure 9:
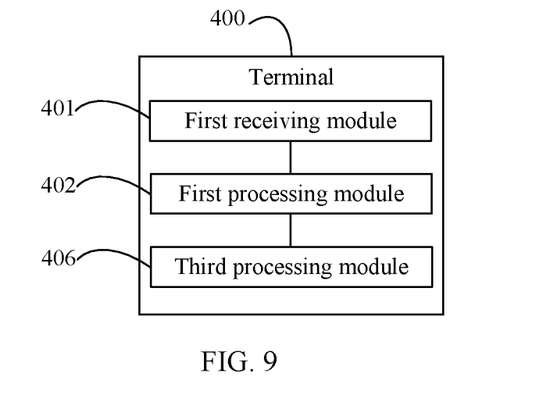
FIG. 9 is a structural diagram of another terminal according to an embodiment of the present disclosure.

Optionally, as shown in FIG. 9, the terminal 400 further includes:
 a third processing module 406, configured to: in a case that reestablishment performed after a radio link failure is detected fails, determine a measurement time window length of a second frequency within a preset time period in which an idle state is already entered, where the second frequency is a frequency determined by the terminal based on the measurement configuration information.

It should be noted that the foregoing terminal 400 in this embodiment of the present disclosure may be a terminal of any implementation in the method embodiment, any implementation of the terminal in the method embodiment can be implemented by the foregoing terminal 400 in this embodiment of the present disclosure, and the same beneficial effects can be achieved. To avoid repetition, details are not described herein again.

Figure 10:
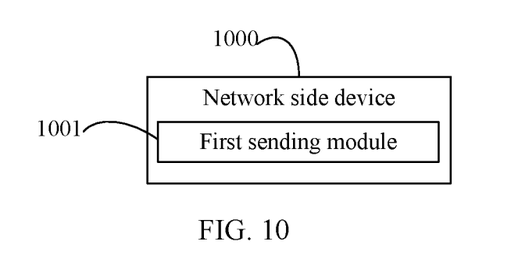
FIG. 10 is a structural diagram of a network side device according to an embodiment of the present disclosure.

Referring to FIG. 10, FIG. 10 is a structural diagram of a network side device according to an embodiment of the present disclosure. As shown in FIG. 10, the network side device 1000 includes:

a first sending module 1001, configured to send connected state measurement configuration information to a terminal, where the measurement configuration information includes S pieces of configuration information, each piece of configuration information includes at least one frequency and priority information of the frequency, and S is a positive integer.

Optionally, each piece of configuration information further includes at least one of the following:

a measurement gap allocation factor of a frequency or a measurement gap configuration of a frequency.

Figure 11:
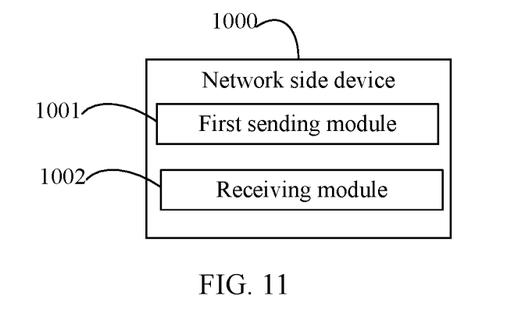
FIG. 11 is a structural diagram of another network side device according to an embodiment of the present disclosure.

Optionally, as shown in FIG. 11, the network side device 1000 further includes:

a receiving module 1002, configured to receive first indication information sent by the terminal, where the first indication information is used to indicate the measurement status value of the terminal.

Optionally, in a case that each piece of configuration information includes a priority of a frequency and a measurement gap configuration of a frequency, a first measurement gap includes a second measurement gap;

the first measurement gap is: a measurement gap in a measurement gap configuration corresponding to a (k+1)-th priority; and the second measurement gap is: a measurement gap in a measurement gap configuration corresponding to a k-th priority, where k is a positive integer.

Optionally, each piece of configuration information further includes cell identifier information of a frequency.

Figure 12:
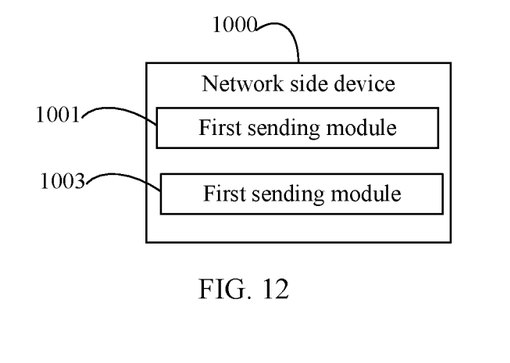
FIG. 12 is a structural diagram of another network side device according to an embodiment of the present disclosure.

Optionally, as shown in FIG. 12, the network side device 1000 further includes:

a second sending module 1003, configured to send second indication information to the terminal, where the second indication information is used to indicate the target configuration information.

It should be noted that the foregoing network side device 1000 in this embodiment of the present disclosure may be a network side device of any implementation in the method embodiment, any implementation of the network side device in the method embodiment can be implemented by the foregoing network side device 1000 in this embodiment of the present disclosure, and the same beneficial effects can be achieved. To avoid repetition, details are not described herein again.

Figure 13:
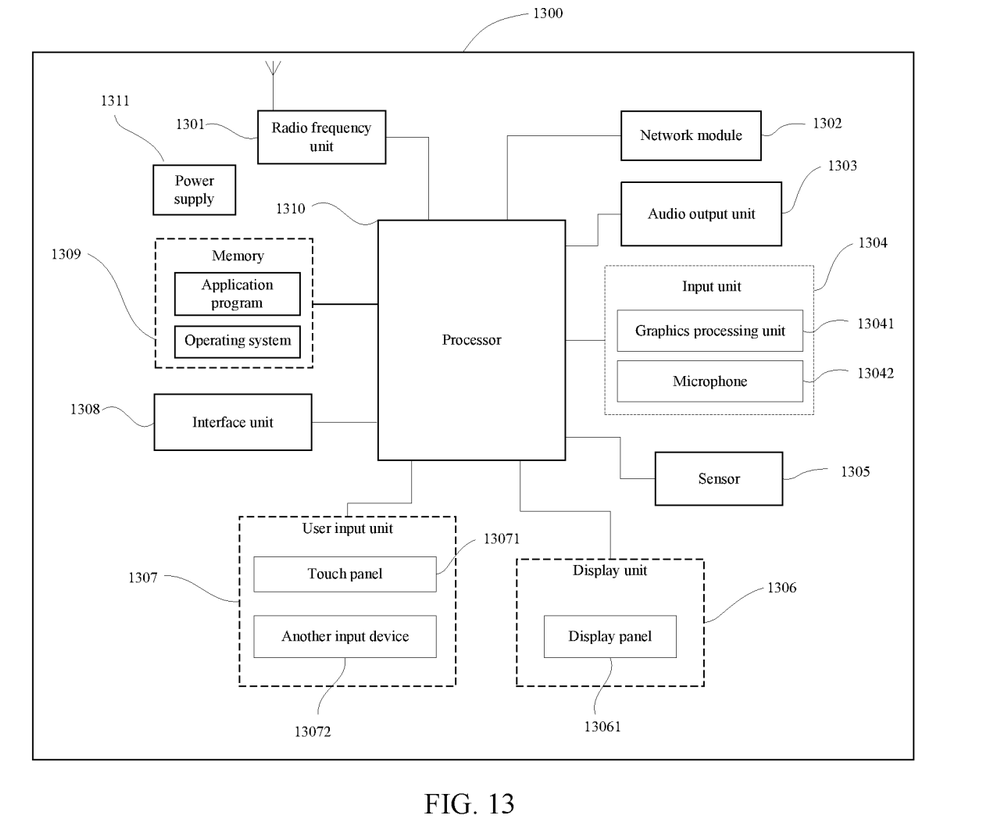
FIG. 13 is a structural diagram of another terminal according to an embodiment of the present disclosure.

Referring to FIG. 13, FIG. 13 is a schematic diagram of a hardware structure of a terminal implementing the embodiments of the present disclosure. The terminal 1300 may include, but is not limited to: a radio frequency unit 1301, a network module 1302, an audio output unit 1303, an input unit 1304, a sensor 1305, a display unit 1306, a user input unit 1307, an interface unit 1308, a memory 1309, a processor 1310, a power supply 1311, and the like. A person skilled in the art may understand that the structure of the terminal 1300 shown in FIG. 13 does not constitute a limitation to the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 1301 is configured to:

receive connected state measurement configuration information, where the measurement configuration information includes S pieces of configuration information, each piece of configuration information includes at least one frequency and priority information of the frequency, and S is a positive integer.

The processor 1310 is configured to:

determine a measurement frequency from the S pieces of configuration information.

Optionally, each piece of configuration information further includes at least one of the following:

a measurement gap allocation factor of a frequency or a measurement gap configuration of a frequency.

Optionally, in a case that each piece of configuration information includes a measurement gap configuration of a frequency, a first measurement gap includes a second measurement gap;

the first measurement gap is: a measurement gap in a measurement gap configuration corresponding to a (k+1)-th priority; and the second measurement gap is: a measurement gap in a measurement gap configuration corresponding to a k-th priority, where k is a positive integer.

Optionally, in a case that each piece of configuration information includes a measurement gap allocation factor of a frequency, the processor 1310 is configured to:

measure a first frequency of measurement frequencies according to a measurement gap allocation ratio;

where the measurement gap allocation ratio is a ratio of a measurement gap allocation factor of the first frequency to a sum of measurement gap allocation factors of the measurement frequencies.

Optionally, each piece of configuration information further includes cell identifier information of a frequency.

Optionally, a priority of the measurement frequency is less than or equal to a measurement status value of the terminal.

Optionally, the radio frequency unit 1301 is further configured to:

send first indication information to a network side device, where the first indication information is used to indicate the measurement status value.

Optionally, the processor 1310 is configured to:

determine target configuration information according to the S pieces of configuration information; and determine the measurement frequency from at least one frequency in the target configuration information.

Optionally, the radio frequency unit 1301 is further configured to:

receive second indication information, where the second indication information is used to indicate the target configuration information.

Optionally, the processor 1310 is further configured to:

in a case that reestablishment performed after a radio link failure is detected fails, determine a measurement time window length of a second frequency within a preset time period in which an idle state is already entered, where the second frequency is a frequency determined by the terminal based on the measurement configuration information.

It should be noted that the terminal 1300 in this embodiment can implement each process performed by the terminal in the method embodiments of the present disclosure, and achieve same beneficial effects. To avoid repetition, details are not described herein again.

It should be understood that in this embodiment of this disclosure, the radio frequency unit 1301 may be configured to receive and send signals in an information reception or transmission or a call process. For example, after receiving downlink data from a base station, the radio frequency unit 1301 sends the downlink data to the processor 1310 for processing, and in addition, sends uplink data to the base station. Generally, the radio frequency unit 1301 includes but is not limited to an antenna, at least one amplifier, a transceiver, a coupler, a low noise amplifier, and a duplexer. In addition, the radio frequency unit 1301 may further communicate with another device through a wireless communications system and network.

The terminal provides wireless broadband Internet access to a user through the network module 1302, for example, helps the user receive and send e-mails, browse web pages, and access streaming media, etc.

The audio output unit 1303 may convert audio data received by the radio frequency unit 1301 or the network module 1302 or stored in the memory 1309 into an audio signal, and output the audio signal into sound. Moreover, the audio output unit 1303 may further provide audio output (for example, call signal receiving sound and message receiving sound) related to a specific function performed by the terminal 1300. The audio output unit 1303 includes a loudspeaker, a buzzer, a receiver, and the like.

The input unit 1304 is configured to receive audio or video signals. The input unit 1304 may include a graphics processing unit (GPU) 13041 and a microphone 13042. The graphics processing unit 13041 processes image data of a static image or a video obtained by an image capturing apparatus (for example, a camera) in a video capturing mode or an image capturing mode. A processed image frame can be displayed on the display unit 1306. The image frame processed by the graphics processing unit 13041 can be stored in the memory 1309 (or another storage medium) or sent via the radio frequency unit 1301 or the network module 1302. The microphone 13042 may receive sound and can process the sound into audio data. The processed audio data can be converted into a format that can be sent to a mobile communications base station through the radio frequency unit 1301 in a telephone call mode, for outputting.

The terminal 1300 further includes at least one type of sensor 1305, such as a light sensor, a motion sensor, and another sensor. The light sensor includes an ambient light sensor and a proximity sensor, where the ambient light sensor can adjust brightness of the display panel 13061 based on brightness of ambient light, and the proximity sensor can turn off the display panel 13061 and/or backlight when the terminal 1300 moves towards the ear. As a motion sensor, an accelerometer sensor may detect magnitude of acceleration in various directions (usually three axes), may detect magnitude and the direction of gravity when stationary, may be configured to identify UE postures (such as horizontal and vertical screen switch, related games, and magnetometer posture calibration), may perform functions related to vibration identification (such as a pedometer and a knock), and the like. The sensor 1305 may further include a fingerprint sensor, a pressure sensor, an iris sensor, a molecular sensor, a gyroscope, a barometer, a hygrometer, a thermometer, an infrared sensor, or the like. Details are not described herein.

The display unit 1306 is configured to display information input by the user or information provided to the user. The display unit 1306 may include a display panel 13061, and the display panel 13061 may be configured in a form of a liquid crystal display (LCD), an organic light-emitting diode (OLED), or the like.

The user input unit 1307 can be configured to receive input numeric or character information, and generate key signal inputs related to user settings and function control of the UE. The user input unit 1307 includes a touch panel 13071 and another input device 13072. The touch panel 13071, also referred to as a touchscreen, may capture a touch operation performed by a user on or near the touch panel (for example, an operation performed by the user on the touch panel 13071 or near the touch panel 13071 by using any appropriate object or accessory such as a finger or a stylus). The touch panel 13071 may include two parts: a touch detection apparatus and a touch controller. The touch detection apparatus detects a touch location of the user, detects a signal carried by a touch operation, and transmits the signal to the touch controller. The touch controller receives touch information from the touch detection apparatus, converts the touch information to point coordinates, and sends the point coordinates to the processor 1310, and receives and executes a command sent by the processor 1310. In addition, the touch panel 13071 may be implemented in various types such as resistive, capacitive, infrared, and surface acoustic wave. In addition to the touch panel 13071, the user input unit 1307 may also include the another input device 13072. The another input device 13072 may include but is not limited to a physical keyboard, a function key (such as a volume control key or a power on/off key), a trackball, a mouse, a joystick, and the like. Details are not described herein.

The touch panel 13071 can cover the display panel 13061. When detecting a touch operation on or near the touch panel 13071, the touch panel 13071 transmits the touch operation to the processor 1310 to determine a type of a touch event. Then the processor 1310 provides a corresponding visual output on the display panel 13061 based on the type of the touch event. In FIG. 13, the touch panel 13071 and display panel 13061 are used as two independent components to implement input and output functions of the terminal. However, in some embodiments, the touch panel 13071 and the display panel 13061 may be integrated to implement the input and output functions of the terminal. This is not specifically limited herein.

The interface unit 1308 is an interface connecting an external apparatus to the terminal 1300. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 1308 can be configured to receive an input (for example, data information and power) from the external apparatus and transmit the received input to one or more elements in the terminal 1300, or transmit data between the terminal 1300 and the external apparatus.

The memory 1309 may be configured to store a software program and various data. The memory 1309 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 1309 may include a high-speed random access memory, or may include a non-volatile memory, for example, at least one magnetic disk storage device, a flash memory device, or other volatile solid-state storage devices.

The processor 1310 is a control center of the UE, connects various parts of the entire UE by using various interfaces and circuits, and performs various functions of the UE and processes data by running or executing software programs and/or modules stored in the memory 1309 and invoking data stored in the memory 1309, so as to monitor the UE as a whole. The processor 1310 may include one or more processing units. Optionally, the processor 1310 may integrate an application processor with a modem processor. The application processor mainly processes the operating system, a user interface, the application program, and the like, and the modem processor mainly processes wireless communication. It can be understood that the above-mentioned modem processor may not be integrated in the processor 1310.

The terminal 1300 may further include a power supply 1311 (such as a battery) that supplies power to each component. Optionally, the power supply 1311 may be logically connected to the processor 1310 by using a power management system, to implement functions such as charging, discharging, and power consumption management by using the power management system.

In addition, the terminal 1300 includes some functional modules not shown. Details are not described herein.

Optionally, an embodiment of the present disclosure further provides a terminal 1300, including a processor 1310, a memory 1309, and a computer program stored in the memory 1309 and executable on the processor 1310. When the computer program is executed by the processor 1310, each process of embodiments of the foregoing measurement configuration method can be implemented, and a same technical effect can be achieved. To avoid repetition, details are not described herein again.

Figure 14:
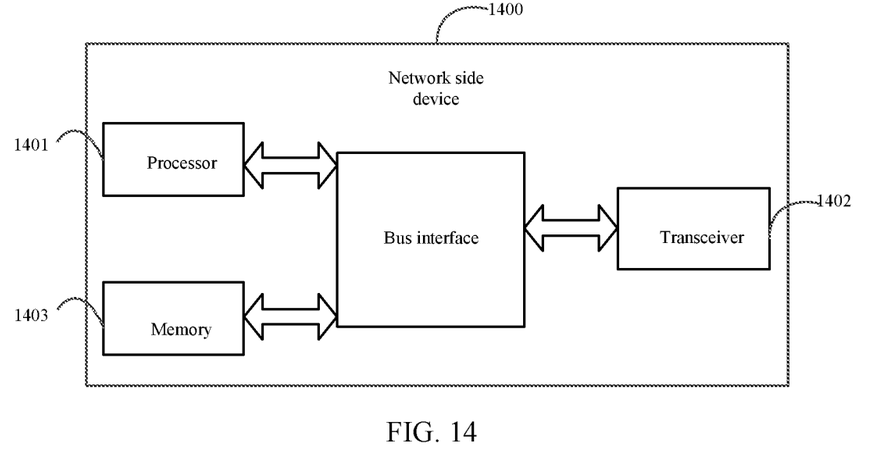
FIG. 14 is a structural diagram of another network side device according to an embodiment of the present disclosure.

Referring to FIG. 14, FIG. 14 is a structural diagram of another network side device according to an embodiment of the present disclosure. As shown in FIG. 14, the network side device 1400 includes a processor 1401, a transceiver 1402, a memory 1403, and a bus interface.

The transceiver 1402 is configured to:
send connected state measurement configuration information to a terminal, where the measurement configuration information includes S pieces of configuration information, each piece of configuration information includes at least one frequency and priority information of the frequency, and S is a positive integer.

The transceiver 1402 is configured to receive and send data under the control of the processor 1401. The transceiver 1402 includes at least two antenna ports.

Optionally, each piece of configuration information further includes at least one of the following:
a measurement gap allocation factor of a frequency or a measurement gap configuration of a frequency.

Optionally, the transceiver 1402 is further configured to:
receive first indication information sent by the terminal, where the first indication information is used to indicate the measurement status value of the terminal.

Optionally, in a case that each piece of configuration information includes a priority of a frequency and a measurement gap configuration of a frequency, a first measurement gap includes a second measurement gap;
the first measurement gap is: a measurement gap in a measurement gap configuration corresponding to a (k+1)-th priority; and
the second measurement gap is: a measurement gap in a measurement gap configuration corresponding to a k-th priority, where k is a positive integer.

Optionally, each piece of configuration information further includes cell identifier information of a frequency.

Optionally, the transceiver 1402 is further configured to:
send second indication information to the terminal, where the second indication information is used to indicate the target configuration information.

In FIG. 14, the bus architecture may include any number of interconnected buses and bridges, which are specifically connected together by various circuits of one or more processors represented by the processor 1401 and a memory represented by the memory 1403. The bus architecture may further link various other circuits such as a peripheral device, a voltage regulator, and a power management circuit together. These are all well-known in the art, and therefore are not further described in this specification. The bus interface provides an interface. The transceiver 1402 may be a plurality of elements, that is, include a transmitter and a receiver, and provide units for communication with various other apparatuses on a transmission medium. For different user equipment, the user interface 1404 may alternatively be an interface for externally and internally connecting required equipment. The connected equipment includes but is not limited to a keypad, a display, a speaker, a microphone, a joystick, and the like.

The processor 1401 is responsible for bus architecture management and general processing. The memory 1403 may store data used by the processor 1401 when the processor 1401 performs an operation.

Optionally, an embodiment of the present disclosure further provides a network side device 1400, including a processor 1401, a memory 1403, and a computer program stored in the memory 1403 and executable on the processor 1401. When the computer program is executed by the processor 1401, each process of embodiments of the foregoing measurement configuration method can be implemented, and a same technical effect can be achieved. To avoid repetition, details are not described herein again.

An embodiment of the present disclosure further provides a non-transitory computer-readable storage medium, where the non-transitory computer-readable storage medium stores a computer program, the computer program, when executed by the processor, implements the processes of the embodiments of the measurement configuration method on a terminal side provided in the embodiments of the present disclosure, or the computer program, when executed by the processor, implements the processes of the embodiments of the measurement configuration method on a network side device side provided in the embodiments of the present disclosure, and the same technical effects can be achieved. To avoid repetition, details are not described herein again. The non-transitory computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software plus a required universal hardware platform, or certainly may be implemented by using hardware. However, in many cases, the former is a better implementation. Based on such an understanding, the technical solutions of the present disclosure essentially or the part contributing to the related art may be implemented in a form of a software product. The computer software product is stored in a storage medium (such as a ROM/RAM, a hard disk, or a compact disc), and includes several instructions for instructing a terminal (which may be a mobile phone, a computer, a server, an air conditioner, a network device, or the like) to perform the method described in the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Those skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate components may or may not be physically separated, and the components displayed as units may or may not be physical units, and may be located in one place or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a non-transitory computer-readable storage medium. Based on such an understanding, the technical solutions of the present disclosure essentially, or the part contributing to the related art, or some of the technical solutions may be implemented in a form of a software product. The computer software product is stored in a storage medium, and includes several instructions for enabling a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

A person of ordinary skill in the art can understand that all or some of the procedures in the methods of the foregoing embodiments may be implemented by a computer program controlling related hardware. The program may be stored in a non-transitory computer-readable storage medium. When the program is executed, the procedures of the embodiments of the foregoing methods may be performed. The foregoing storage medium may be a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For implementation with hardware, the module, unit, and subunit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing functional modules (for example, a process and a function) in the embodiments of the present disclosure. Software codes can be stored in the memory and executed by the processor. The memory may be implemented in the processor or outside the processor.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A measurement configuration method, comprising:
receiving, by a terminal, connected state measurement configuration information, wherein the measurement configuration information comprises S pieces of configuration information, each piece of configuration information comprises at least one frequency and priority information of the frequency, and S is a positive integer;
determining, by the terminal, a measurement frequency from the S pieces of configuration information; and
in a case that reestablishment performed after a radio link failure is detected fails, determining, by the terminal, a measurement time window length of a second frequency within a preset time period in which an idle state is already entered, wherein the second frequency is a frequency determined by the terminal based on the measurement configuration information.

2. The method according to claim 1, wherein each piece of configuration information further comprises at least one of:
a measurement gap allocation factor of a frequency or a measurement gap configuration of a frequency.

3. The method according to claim 2, wherein in a case that each piece of configuration information comprises a measurement gap configuration of a frequency, a first measurement gap comprises a second measurement gap;
the first measurement gap is: a measurement gap in a measurement gap configuration corresponding to a (k+1)-th priority; and
the second measurement gap is: a measurement gap in a measurement gap configuration corresponding to a k-th priority, wherein k is a positive integer.

4. The method according to claim 2, wherein in a case that each piece of configuration information comprises a measurement gap allocation factor of a frequency, after determining, by the terminal, a measurement frequency from the S pieces of configuration information, the method further comprises:
measuring, by the terminal, a first frequency of measurement frequencies according to a measurement gap allocation ratio;
wherein the measurement gap allocation ratio is a ratio of a measurement gap allocation factor of the first frequency to a sum of measurement gap allocation factors of the measurement frequencies.

5. The method according to claim 1, wherein each piece of configuration information further comprises cell identifier information of a frequency.

6. The method according to claim 1, wherein a priority of the measurement frequency is less than or equal to a measurement status value of the terminal.

7. The method according to claim 6, after the receiving, by the terminal, connected state measurement configuration information, further comprising:
sending, by the terminal, first indication information to a network side device, wherein the first indication information is used to indicate the measurement status value.

8. The method according to claim 1, wherein S is greater than 1, and the determining a measurement frequency from the S pieces of configuration information comprises:
determining target configuration information according to the S pieces of configuration information; and
determining the measurement frequency from at least one frequency in the target configuration information.

9. The method according to claim 8, before the determining, by the terminal, a measurement frequency from the S pieces of configuration information, further comprising:
receiving, by the terminal, second indication information, wherein the second indication information is used to indicate the target configuration information.

10. A terminal, comprising: a memory, a processor, and a computer program stored in the memory and executable on the processor, wherein the computer program, when executed by the processor causes the terminal to perform:
receiving connected state measurement configuration information, wherein the measurement configuration information comprises S pieces of configuration information, each piece of configuration information comprises at least one frequency and priority information of the frequency, and S is a positive integer;
determining, by the terminal, a measurement frequency from the S pieces of configuration information; and
in a case that reestablishment performed after a radio link failure is detected fails, determining, by the terminal, a measurement time window length of a second frequency within a preset time period in which an idle state is already entered, wherein the second frequency is a frequency determined by the terminal based on the measurement configuration information.

11. The terminal according to claim 10, wherein each piece of configuration information further comprises at least one of:
a measurement gap allocation factor of a frequency or a measurement gap configuration of a frequency.

12. The terminal according to claim 10, wherein each piece of configuration information further comprises cell identifier information of a frequency.

13. The terminal according to claim 10, wherein a priority of the measurement frequency is less than or equal to a measurement status value of the terminal.

14. A network side device, comprising: a memory, a processor, and a computer program stored in the memory and executable on the processor, wherein the computer program, when executed by the processor, causes the network side device to perform:
sending connected state measurement configuration information to a terminal, wherein the measurement configuration information comprises S pieces of configuration information, each piece of configuration information comprises at least one frequency and priority information of the frequency, and S is a positive integer, to enable the terminal to determine a measurement frequency from the S pieces of configuration information, and to determine a measurement time window length of a second frequency within a preset time period; and
receiving first indication information sent by the terminal, wherein the first indication information is used to indicate the measurement status value of the terminal.

15. The network side device according to claim 14, wherein each piece of configuration information further comprises at least one of:
a measurement gap allocation factor of a frequency or a measurement gap configuration of a frequency.

16. The network side device according to claim 14, wherein in a case that each piece of configuration information comprises a measurement gap configuration of a frequency, a first measurement gap comprises a second measurement gap;
the first measurement gap is: a measurement gap in a measurement gap configuration corresponding to a (k+1)-th priority; and
the second measurement gap is: a measurement gap in a measurement gap configuration corresponding to a k-th priority, wherein k is a positive integer.

17. The network side device according to claim 14, wherein each piece of configuration information further comprises cell identifier information of a frequency.

18. The network side device according to claim 14, wherein the computer program, when executed by the processor, causes the network side device to further perform:
sending second indication information to the terminal, wherein the second indication information is used to indicate target configuration information.

19. A non-transitory computer-readable storage medium, wherein a computer program is stored in the non-transitory computer-readable storage medium, when the computer program is executed by a processor, steps of the measurement configuration method according to claim 1 are implemented.

20. A non-transitory computer-readable storage medium, wherein a computer program is stored in the non-transitory computer-readable storage medium, when the computer program is executed by a processor, steps of the measurement configuration method according to claim 2 are implemented.

\* \* \* \* \*